(12) United States Patent
Wormsbächer et al.

(10) Patent No.: US 6,280,337 B1
(45) Date of Patent: Aug. 28, 2001

(54) CONSTANT VELOCITY JOINT WITH IMPROVED PROFILE

(75) Inventors: Hans Wormsbächer, Lake Orion; Donald Wayne Dine, Rochester Hills, both of MI (US)

(73) Assignee: GKN Automotive, Inc., AuburnHills, MI (US)

( * ) Notice: Subject to any disclaimer, the term of this patent is extended or adjusted under 35 U.S.C. 154(b) by 0 days.

(21) Appl. No.: 09/578,836

(22) Filed: May 25, 2000

(51) Int. Cl.$^7$ ........................................................ F16D 3/16
(52) U.S. Cl. .............................. 464/145; 464/15; 464/906
(58) Field of Search ................................ 464/15, 145, 906

(56) References Cited

U.S. PATENT DOCUMENTS

| | | | |
|---|---|---|---|
| 3,982,840 | * | 9/1976 | Grosseau ................................. 403/14 |
| 4,156,353 | * | 5/1979 | Welschof ............................... 464/145 |
| 4,275,571 | * | 6/1981 | Welschof ............................... 464/145 |
| 5,451,185 | * | 9/1995 | Krude et al. .......................... 464/145 |
| 5,509,855 | * | 4/1996 | Wormbsacher et al. ............. 464/145 |
| 5,616,081 |   | 4/1997 | Krüde et al. . |
| 5,947,826 |   | 9/1999 | Seguin . |
| 6,132,316 | * | 10/2000 | Statham ................................ 464/145 |

FOREIGN PATENT DOCUMENTS

| | | |
|---|---|---|
| 2318853 | 4/2000 | (GB) . |
| 2318852 | 5/2000 | (GB) . |

* cited by examiner

Primary Examiner—Lynne H. Browne
Assistant Examiner—Aaron M Dunwoody
(74) Attorney, Agent, or Firm—Mick A. Nylander

(57) ABSTRACT

A constant velocity ball joint includes an outer race having a plurality of first tracks separated by first lands. Each first land has a first land surface. The joint further includes an inner race having a plurality of second tracks separated by second lands. A cage is disposed between the races. The cage has an outer cage surface facing the outer race, an inner cage surface facing the inner race, and a plurality of circumferentially distributed windows. A plurality of torque-transmitting balls are disposed in the windows, and are engageable with the tracks. At least one of the group consisting of the first land surfaces and the inner cage surface includes ramped portions that are engageable with a respective one of the group consisting of the outer cage surface and the inner race.

1 Claim, 2 Drawing Sheets

CONSTANT VELOCITY JOINT WITH IMPROVED PROFILE

TECHNICAL FIELD

The invention relates to constant velocity ball joints that are used to transfer torque between a drive element and a driven element.

BACKGROUND ART

Prior constant velocity ball joints include outer and inner races, and a ball cage disposed between the races. The ball cage typically has a spherical outer cage surface that engages spherical inner surface portions of the outer race, and a spherical inner cage surface that engages spherical outer surface portions of the inner race. With such a configuration, contact between adjacent surfaces is maximized. As a result, frictional losses are significant. Furthermore, it is difficult to lubricate these surfaces.

DISCLOSURE OF INVENTION

The invention addresses the shortcomings of the prior art by providing a constant velocity ball joint having an improved profile that reduces contact between adjacent surfaces. As a result, the joint has improved efficiency and reduced heat generation compared with prior constant velocity ball joints.

Under the invention, a constant velocity ball joint includes an outer race having a plurality of first tracks separated by first lands. Each first land has a first land surface. The joint further includes an inner race having a plurality of second tracks separated by second lands. A cage is disposed between the races. The cage has an outer cage surface facing the outer race, an inner cage surface facing the inner race, and a plurality of circumferentially distributed windows. A plurality of torque-transmitting balls are disposed in the windows, and are engageable with the tracks. At least one of the group consisting of the first land surfaces and the inner cage surface includes ramped portions that are engageable with a respective one of the group consisting of the outer cage surface and the inner race.

The at least one of the group consisting of the first land surfaces and the inner cage surface may further include recessed portions proximate the ramped portions. The recessed portions provide improved lubrication of the joint. Furthermore, the recessed portions cooperate with the ramped portions to provide room for expansion of the cage, which may occur as the joint heats up during operation.

Preferably, the first land surfaces and the inner cage surface each include ramped portions. Furthermore, the ramped portions of the inner cage surface preferably cooperate to define a continuous frusto-conical surface portion.

These and other objects, features and advantages of the invention are readily apparent from the following detailed description of the best modes for carrying out the invention when taken in conjunction with the accompanying drawings.

BEST MODES FOR CARRYING OUT THE INVENTION

Figure 1:
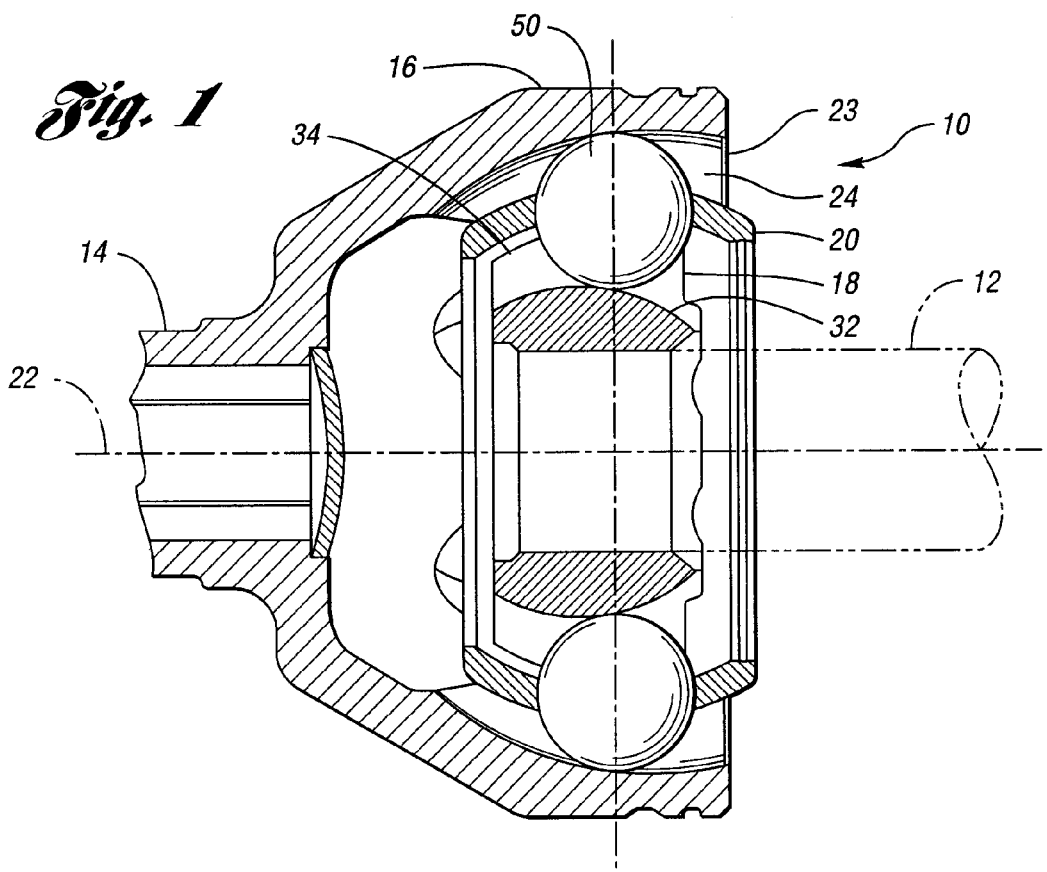
FIG. 1 is a cross-sectional view of a constant velocity ball joint according to the invention showing an outer race, an inner race and a ball cage disposed between the races.
Figure 2:
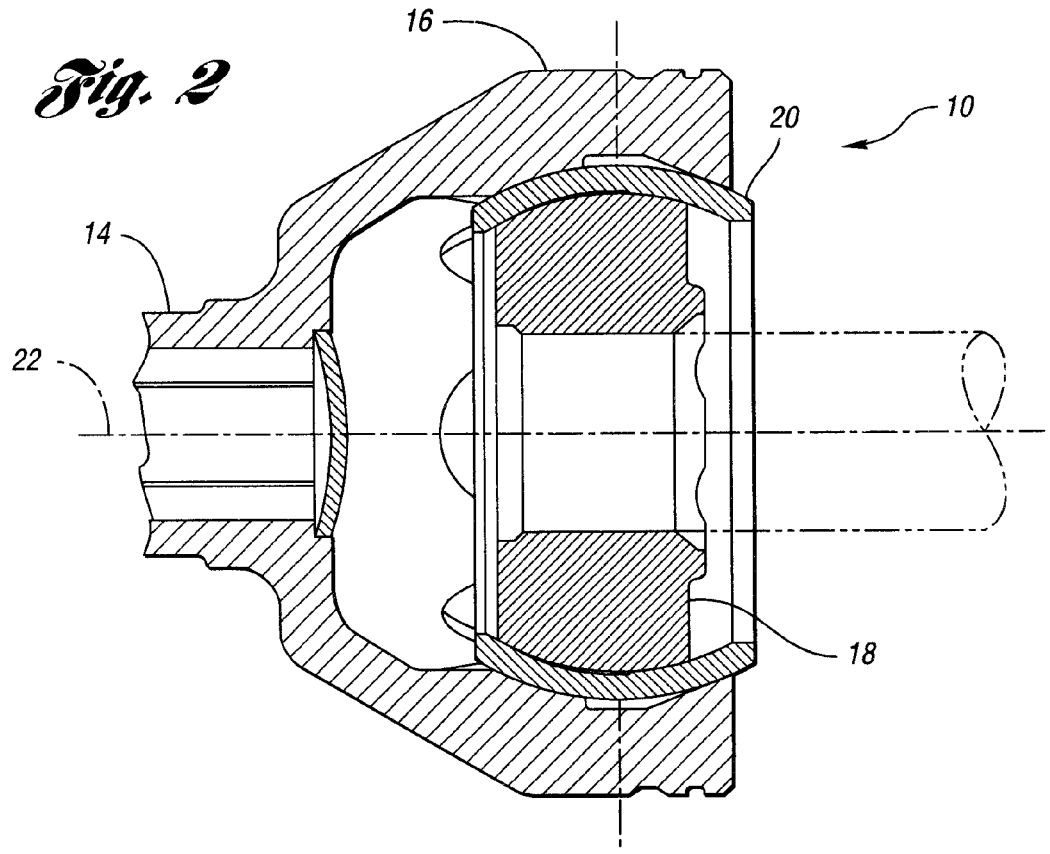
FIG. 2 is a cross-sectional view of the joint taken at a different angle than FIG. 1 to show engaging surfaces of the races and ball cage.
Figure 3:
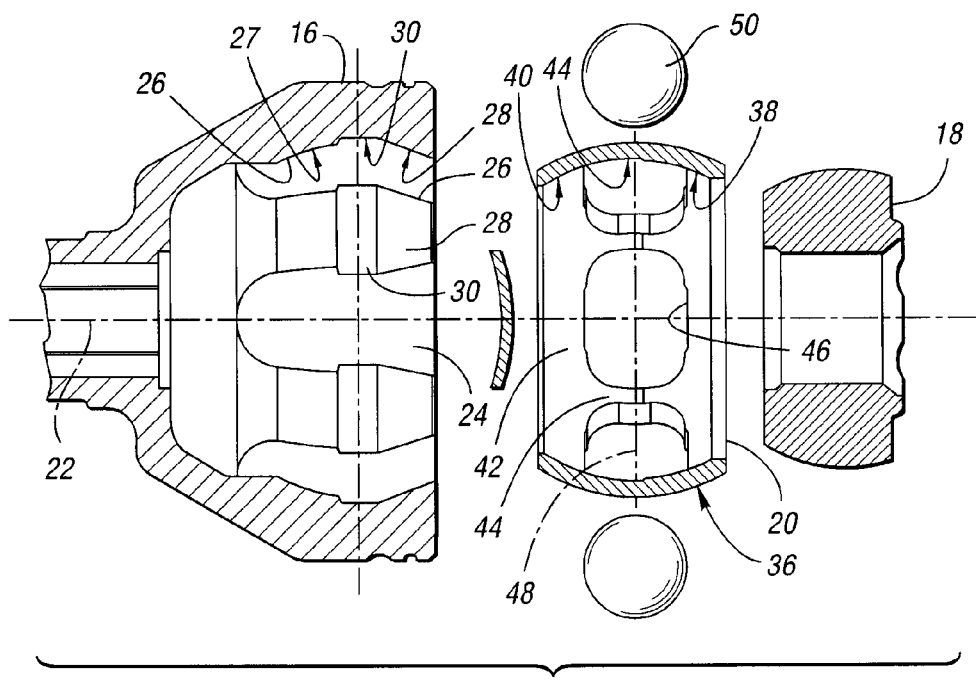
FIG. 3 is an exploded cross-sectional view of the outer race, ball cage and inner race.
Figure 4:
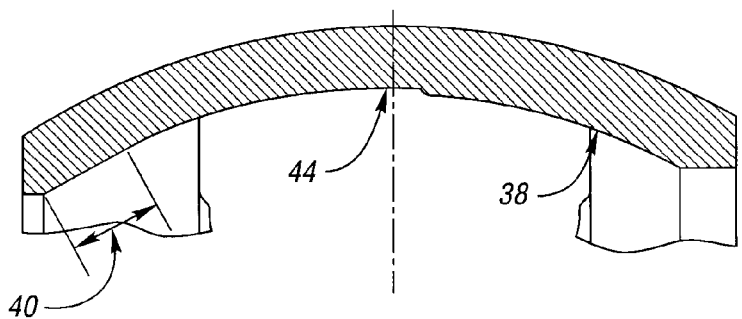
FIG. 4 is an enlarged cross-sectional view of a portion of the ball cage.

FIGS. 1 and 2 show a constant velocity ball joint 10 according to the present invention for transferring torque between a drive shaft 12 and a driven shaft 14. The joint 10 includes an outer joint part or outer race 16, an inner joint part or inner race 18, and a ball cage 20 disposed in an annular space between the races 16 and 18. While the joint 10 is configured to operate through a wide range of angles, FIGS. 1 and 2 show the races 16 and 18 and ball cage 20 aligned along a common central axis 22.

Referring to FIGS. 1–4, the outer race 16 is connected to the driven shaft 14 in any suitable manner. Alternatively, the outer race 16 and the driven shaft 14 may be formed as a single component. The outer race 16 includes an open front end 23 and a plurality of first tracks 24 separated by first lands 26. Each first land 26 includes a first land surface 27 having a first slanted or ramped portion 28 and a first recessed portion 30 disposed adjacent the first ramped portion 28.

The first ramped portions 28 are load-bearing, conical surface portions that are engageable with the ball cage 20. More specifically, each first ramped portion 28 curves about the axis 22, but has a substantially constant slope at any axial cross-section that extends through the particular first ramped portion 28. In other words, each first ramped portion 28 has a substantially straight line profile.

The inner race 18 is connected to the drive shaft 12 in any suitable manner. Alternatively, the inner race 18 and the drive shaft 12 may be formed as a single component. The inner race 18 includes a plurality of second tracks 32 separated by second lands 34. The inner race 18 is aligned with the outer race 16 such that each second track 32 is radially aligned with a respective first track 24.

The ball cage 20 has an outer cage surface 36 facing the outer race 16 and engageable with the ramped portions 28, and an inner cage surface 38 facing the inner race 18. The inner cage surface 38 has a plurality of second ramped portions 40, which are load-bearing, conical surface portions that are engageable with the inner race 18. Similar to the first ramped portions 28, each second ramped portion 40 has a substantially constant slope at any axial cross-section that extends through the particular second ramped portion 40. Furthermore, the second ramped portions 40 preferably cooperate to define a continuous, frusto-conical surface 42. Additionally, the inner cage surface 38 has a plurality of second recessed portions 44 adjacent the second ramped portions 40.

The ball cage 20 further has a plurality of circumferentially distributed windows 46 extending from the outer cage surface 36 to the inner cage surface 38. A cage plane 48 bisects the windows 46.

A torque-transmitting ball 50 is disposed in each window 46. Each ball 50 is engageable with a pair of first and second tracks 24 and 32, respectively, for transmitting torque between the outer and inner races 16 and 18, respectively.

During operation of the joint 10, the balls 50 cooperate with the tracks 24 and 32 to urge the ball cage 20 forwardly toward the front end 23 and away from the driven shaft 14. The balls 50 also cooperate with the tracks 24 and 32 to urge the inner race 18 rearwardly toward the driven shaft 14 and away from the front end 23. As a result, the outer cage surface 36 is urged into engagement with the first ramped portions 28, and the inner race 18 is urged into engagement with the second ramped portions 40.

Because the ramped portions 28 and 40 have substantially straight line profiles, contact between the outer race 16 and the ball cage 20, and between the inner race 18 and the ball cage 20 is minimized. Furthermore, with such a configuration, lubrication of the races 16 and 18 and ball cage 20 is significantly improved. As a result, the joint 10 is significantly more efficient than prior constant velocity ball joints. Additionally, heat generated by the joint 10 during operation is significantly reduced.

The recessed portions 30 and 44 enable additional lubricant to be disposed between the outer race 16 and the ball cage 20, and between the inner race 18 and the ball cage 20. Furthermore, the recessed portions 30 and 44 cooperate with the ramped portions 28 and 40 to provide room for expansion of the ball cage 20 and/or races 16 and 18, which may occur as the joint 10 heats up during operation.

Figure 5:
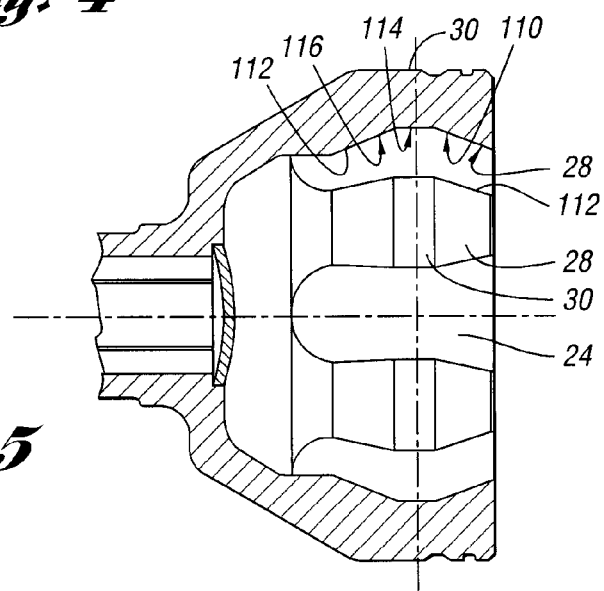
FIG. 5 is a cross-sectional view of a second embodiment of the outer race.

FIG. 5 shows a second embodiment I 10 of the outer race. The outer race 110 includes the first tracks 24 of the outer race 16, and the first tracks 24 are separated by first lands 112. Each first land 112 includes a first land surface 114, and the first land surfaces 114 include the first ramped portions 28 and first recessed portions 30 of the outer race 16. Each first land surface 114 further includes an additional slanted or ramped portion 116 disposed adjacent a respective recessed portion 30. These additional ramped portions 116 are engageable with the outer cage surface 36 of the ball cage 20. Thus, the outer race 116 has even less contact with the ball cage 20 than does the outer race 16. Furthermore, the additional ramped portions 116 provide additional room for the ball cage 20 to expand.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A constant velocity ball joint comprising:

an outer race having a plurality of first tracks separated by first lands, each first land including a first land surface having a ramped portion and a first recessed portion adjacent the ramped portion;

an inner race having a plurality of second tracks separated by second lands;

a cage disposed between the races, the cage having an outer cage surface facing the outer race, an inner cage surface facing the inner race, and a plurality of circumferentially distributed windows, the outer cage surface being engageable with the ramped portions of the outer race, the inner cage surface having a frusto-conical portion, and a plurality of second recessed portions adjacent the frusto-conical portion wherein each second recessed portion is at least partially disposed between two windows, and the frusto-conical portion is engageable with the inner race; and a plurality of torque-transmitting balls engageable with the tracks for transmitting torque between the races, one ball being disposed in each window.

* * * * *